United States Patent Office 2,880,171
Patented Mar. 31, 1959

2,880,171

HYDRODESULFURIZATION OF HYDROCARBONS WITH CATALYST COMPOSED OF MOLYBDENUM AND TWO MEMBERS OF THE IRON GROUP METALS

Richard A. Flinn, Verona, and Joseph B. McKinley, Pittsburgh, Pa., assignors to Gulf Research & Development Company, Pittsburgh, Pa., a corporation of Delaware No Drawing. Application October 31, 1956
Serial No. 619,405

11 Claims. (Cl. 208—216)

This invention relates to an improved catalyst and improved procedure for catalytic hydrodesulfurization of petroleum hydrocarbons.

The hydrodesulfurization of petroleum hydrocarbons is of course well known. It is also well known to use compounds or mixtures of iron group metal oxides or sulfides with the oxide or sulfide of molybdenum as catalysts in the hydrodesulfurization process. A typical catalyst of this type is cobalt molybdate or cobalt oxide-molybdenum oxide. Far reaching desulfurization is hard to effect and catalysts giving improved results in this respect are needed in the petroleum industry.

This invention has for its object to provide an improved catalyst for the hydrodesulfurization of petroleum hydrocarbons. Another object is to provide an improved process for hydrodesulfurizing petroleum hydrocarbons. A further object is to provide a highly active catalyst of the type containing iron group metal oxides or sulfides combined or mixed with molybdenum oxide or sulfide. Another object is to improve the state of the art. Other objects of this invention will appear hereinafter.

These and other objects are accomplished by our invention which comprises a supported catalyst which contains as active hydrogenating components molybdenum and at least two members of the iron group metals. The iron group components of this improved catalyst are present in such amounts that the sum of the atomic ratios of the iron group metals to molybdenum is less than about 0.8 and the atomic ratio of each iron group metal to molybdenum is less than about 0.4. These active hydrogenating components are present as oxides and/or sulfides of the metals and may be in combinations of the oxides or sulfides of the iron group with the oxide or sulfide of molybdenum. Our invention also includes a hydrodesulfurization process utilizing this catalyst.

In the following examples and description we have set forth several of the preferred embodiments of our invention, but it is to be understood that they are given by way of illustration and not in limitation thereof.

The improved catalyst may contain molybdenum in the amounts conventionally used, i.e. about 2 to about 25 percent molybdenum based on the total weight of the catalyst including carrier. Smaller amounts of molybdenum than two percent may be used but this reduces the activity. Larger amounts than 25 percent can also be used but do not increase the activity and constitute an extra expense. We prefer to utilize a catalyst containing between about 4 and 16 percent molybdenum. The amounts of the iron group metal may be varied as long as the above proportions are used. However, we prefer to utilize one iron group metal in an atomic ratio between about 0.1 and 0.2 and to utilize the other iron group metal or metals in an atomic ratio of iron group metal to molybdenum of less than about 0.1 and especially between about 0.05 and 0.01. All of the iron group metals may be present but we prefer to use only two.

The above mentioned active hydrogenating components may be present as mixtures of oxides and/or sulfides. On the other hand chemical combinations of the iron group metal oxides or sulfides with the molybdenum oxide and/or sulfide may be utilized. Methods of preparing such mixed oxide or sulfide catalysts or combinations of oxide or sulfide catalysts are well known in the prior art. Any such method may be used. In general aqueous solutions of the water soluble salts of these active hydrogenating components are usually used to impregnate supports or carriers. These carriers are of a foraminous or porous nature and any such support may be used. Examples of satisfactory supports are alumina, alumina stabilized with a small amount of silica such as about 2 to 10 percent silica, bauxite and silica-alumina cracking catalysts. The supports are usually shaped such as in the form of granules, pellets or balls prior to impregnation. On the other hand, the catalyst may be in the form of a powder such as is used for fluid type operations. It is preferred to first deposit the molybdenum component from an aqueous solution such as aqueous ammonium molybdate, ammonium paramolybdate, molybdenum pentachloride or molybdenum oxalate. Vacuum impregnation may be used to improve the impregnation. After filtering and drying, the impregnant is calcined to convert it into the oxide. The carrier is then treated with an aqueous solution of the iron group metal salt followed by calicining. Thereafter the second iron group metal is deposited in the same way. Nitrates or acetates of the iron group metals are preferably utilized although any water soluble salt which leaves no harmful residue can be used. If desired, the iron group metals and molybdenum may be deposited simultaneously but are preferably deposited in sequence with intervening calcining. Simultaneous impregnation of the iron group metals is quite satisfactory. Calcining is usually accomplished by heating in air to a temperature of about 800°–1200° F. If desired, the entire catalyst including the support may be formed in one operation by the well known coprecipitation method of preparing catalysts. Alternatively all of the active hyrdogenating components may be coprecipitated on a preformed support. When a sulfide catalyst is desired, the catalyst prepared as described above may be treated in known manner with hydrogen sulfide or preferably a hydrogen-hydrogen sulfide mixture at elevated temperature.

The improved catalysts constituting our invention may be utilized to hydrodesulfurize sulfur-containing hydrocarbons in general. Thus they may be used to hydrodesulfurize furnace oil, naphtha, cracking charge stock, shale oils, coke-oven oils, or residual-containing hydrocarbons such as whole crude or reduced crude. In general the hydrodesulfurization process involves contacting the sulfur-containing hydrocarbon with hydrogen in the presence of the improved catalyst at a temperature between about 500° and 900° F., at a pressure between about 250 and 4000 p.s.i. and preferably at a pressure between about 500 and 2000 p.s.i., utilizing a space velocity between about 0.25 and 16, and added hydrogen in amounts between about 200 and 20,000 standard cubic feet per barrel of hydrocarbon. The exact conditions selected will depend upon the catalyst, the particular charge stock to be treated and the degree of desulfurization desired. For instance, furnace oil is preferably treated at a temperature of about 600° to 700° F. whereas for a residual-containing fraction it is preferable to utilize a higher temperature of 700° to 800° F. or even 875° F. if simultaneous conversion into lower boiling products is desired.

It is desirable to utilize as low a temperature as possible and still obtain the desired results. This is due to the fact that the degree of activation or promotion of our catalyst becomes more pronounced at the lower reaction temperatures. Treatment of the residual fractions would also be advantageously carried out in the lower portion of the space velocity range mentioned whereas furnace oil would preferably be carried out at a higher space velocity in the middle or upper portion of the range mentioned. The hydrogen recycle rate does not vary particularly with charge stocks and preferably should be between about 2000 and 10,000 standard cubic feet per barrel. While our improved catalyst is highly active for this particular reaction, it can be employed in other reactions, such as saturative hydrogenation, where catalysts comprising combinations or mixtures of iron group metals with group VI, left-hand column metals of the periodic system have been found useful.

When treating such hydrocarbons it has been customary to continue the reaction until the catalyst activity has decreased markedly due to deposition of coke or carbonaceous material thereon. The catalyst is then regenerated by combustion, i.e. by contact with oxygen-containing gas such as air at elevated temperature usually above 1000° F. It has been found in connection with prior art catalysts that such regeneration causes gradual loss in activity of the catalyst. It has been found that our improved catalyst maintains its full activity for a much longer portion of the on-stream period and that it even increases in activity during a large part of the on-stream cycle. Thus several operations with throughputs of 250 to 500 showed no decrease in activity. It has also been found that repeated regeneration does not cause an abnormal decrease in activity of our improved catalyst.

EXAMPLE 1

A series of catalysts having the compositions shown in Table I were prepared by deposition of the active components on Alcoa F–10 grade alumina. The molybdenum was deposited on the calcined alumina base from a solution prepared by dissolving ammonium paramolybdate in an ammoniacal water solution. Specifically, the ammonium paramolybdate was dissolved in about one-half the amount of water which was to be required; then 0.437 cc. of 28% ammonia solution was added for each gram of ammonium paramolybdate used. This amount of ammonia was sufficient to yield ammonium molybdate. To this mixture sufficient water was added to bring the solution to the desired concentration. The concentration required was determined by the known absorptivity of the base and the desired final catalyst composition. The method of depositing the salt from this solution was a vacuum impregnation employed as follows. After evacuating the base to 6 mm. Hg and holding it at 6 mm. for one-half hour, the solution was introduced. The mixture was allowed to stand under its own vacuum for five minutes after which it was bled to atmospheric pressure and allowed to stand another ten minutes. The excess solution was then removed by filtration. Following the initial impregnation, the material was then dried for 24 hours at 250° F., being stirred frequently to eliminate maldistribution of impregnant. After drying, the material was raised to 900° F. in six hours and calcined at that temperature for ten hours. The group VIII metals were deposited upon the molybdenum-alumina base from a water solution of the metal nitrate or nitrates. The vacuum impregnation, drying, and calcining were exactly as outlined above in connection with the molybdenum salt.

The catalysts having compositions shown in Table I were then compared for hydrodesulfurization activity by contacting a furnace oil derived from fluid catalytic cracking and containing 1.93% by weight of sulfur with hydrogen in the presence of the particular catalyst under test at an average temperature of about 700° F., a pressure of about 600 p.s.i.g., a liquid hourly space velocity (vol./hr./vol.) of about 8, for a throughput (vol./vol.) of about 48 and with a hydrogen ratio of about 2000 standard cubic feet per barrel of charge.

Table I

| Run No. | Atomic Ratio of Metals in the Catalyst [1] | Percent Desulfurized |
|---|---|---|
| 1 | 0.5 Co:1.0 Mo | 80.3 |
| 2 | 0.5 Ni:1.0 Mo | 84.0 |
| 3 | (0.5 Co+0.5 Ni):1.0 Mo | 81.4 |
| 4 | (0.5 Co+0.2 Ni):1.0 Mo | 80.3 |
| 5 | 0.4 Co:1.0 Mo | 86.5 |
| 6 | 0.3 Co:1.0 Mo | 89.2 |
| 7 | 0.2 Co:1.0 Mo | 80.8 |
| 8 | 0.2 Ni:1.0 Mo | 74.6 |
| 9 | (0.2 Co+0.2 Ni):1.0 Mo | 89.6 |
| 10 | (0.2 Co+0.1 Ni):1.0 Mo | 87.6 |
| 11 | (0.2 Co+0.05 Ni):1.0 Mo | 88.1 |
| 12 | (0.2 Co+0.01 Ni):1.0 Mo | 89.2 |
| 13 | 0.1 Co:1.0 Mo | 78.6 |
| 14 | 0.1 Ni:1.0 Mo | 69.4 |
| 15 | (0.1 Co+0.1 Ni):1.0 Mo | 82.4 |
| 16 | (0.1 Co+0.01 Ni):1.0 Mo | 86.0 |
| 17 | 0.2 Fe:1.0 Mo | 58.5 |
| 18 | (0.2 Ni+0.2 Fe):1.0 Mo | 80.3 |
| 19 | (0.1 Ni+0.1 Fe):1.0 Mo | 75.6 |
| 20 | (0.2 Co+0.1 Fe):1.0 Mo | 86.6 |

[1] All catalysts contained 8 percent by weight molybdenum.

Referring to Table I it will be noted from comparing runs 1, 2 and 3 that addition of nickel in large amounts did not result in promotion. Comparing runs 1 and 4 shows that catalysts in which the atomic ratio of iron group metal to molybdenum is high are not activated by small proportions of the second iron group metal. Comparing run 7 and runs 9 to 12 shows that exceptional promotion is obtained utilizing about 0.2 atomic ratio of primary iron group metal and less than about 0.1 of the second iron group metal. A similar improvement is shown for about 0.1 atomic ratio of the primary iron group metal by comparing runs 15 and 16 with runs 13 and 14. Runs 17 to 20 indicate that similar effects are obtained when other iron group metals are used.

While Example 1 does not show that 0.3 or 0.4 mol ratio of cobalt to molybdenum was activated by addition of a second iron group metal, the data presented in Examples 2 and 3 establish this fact.

EXAMPLE 2

Two catalysts having the compositions shown in Table II were prepared in the same manner described in Example 1. These catalysts were then compared for hydrodesulfurization activity by contacting a furnace oil derived from fluid catalytic cracking and containing 1.39 percent by weight of sulfur with hydrogen in the presence of the particular catalyst under test at an average temperature of about 650° F., a pressure of about 600 p.s.i.g., a liquid hourly space velocity (vol./hr./vol.) of about 4, for a throughput (vol./vol.) of about 40 and with a hydrogen ratio of about 4000 standard cubic feet per barrel of charge.

Table II

| Run No. | Catalyst | Percent Desulfurized |
|---|---|---|
| 1 | 0.3 Co:1.0 Mo | 77.0 |
| 2 | (0.3 Co+0.05 Ni):1.0 Mo | 79.3 |

EXAMPLE 3

Two catalysts having the compositions shown in Table III were prepared in the same manner described in Example 1. These catalysts were then compared for hydrodesulfurization activity by contacting a furnace oil derived from fluid catalytic cracking and containing 1.39 percent by weight of sulfur with hydrogen in the presence of the particular catalyst under test at an average temperature of about 600° F., a pressure of about 600 p.s.i.g., a liquid hourly space velocity (vol./hr./vol.) of about 6, for a throughput (vol./vol.) of about 36 and with a hydrogen ratio of about 4000 standard cubic feet per barrel of charge.

Table III

| Run No. | Catalyst | Percent Desulfurized |
|---|---|---|
| 1 | 0.4 Co:1.0 Mo | 63.3 |
| 2 | (0.4 Co+0.05 Ni):1.0 Mo | 64.9 |

We claim:

1. A catalyst supported on a porous carrier and having high activity for hydrodesulfurization of sulfur-containing hydrocarbons, said catalyst containing active hydrogenating components which consist essentially of molybdenum and at least two members of the iron group metals, the iron group components being present in such amounts that the sum of the atomic ratios of the iron group metals to molybdenum is less than about 0.8 and the atomic ratio of each iron group metal to molybdenum is less than about 0.4., said active hydrogenating components being present in the form of a member of the group consisting of oxides of said metals, sulfides of said metals, combinations of the oxides of the iron group metals with molybdenum oxide and combinations of the sulfides of the iron group metals with molybdenum sulfide.

2. A catalyst supported on a porous carrier and having high activity for hydrodesulfurization of sulfur-containing hydrocarbons, said catalyst containing active hydrogenating components which consist essentially of molybdenum and at least two members of the iron group metals, the atomic ratio of each of the members of the iron group to the molybdenum being less than about 0.2, said active hydrogenating components being present in the form of a member of the group consisting of oxides of said metals, sulfides of said metals, combinations of the oxides of the iron group metals with molybdenum oxide and combinations of the sulfides of the iron group metals with molybdenum sulfide.

3. A catalyst supported on a porous carrier and having high activity for hydrodesulfurization of sulfur-containing hydrocarbons, said catalyst containing active hydrogenating components which consist essentially of molybdenum and at least two members of the iron group metals, the atomic ratio of one of the members of the iron group to the molybdenum being less than about 0.2 and the other member of the iron group being present in a substantially smaller atomic ratio than the first mentioned member of the iron group, said active hydrogenating components being present in the form of a member of the group consisting of oxides of said metals, sulfides of said metals, combinations of the oxides of the iron group metals with molybdenum oxide and combinations of the sulfides of the iron group metals with molybdenum sulfide.

4. A catalyst supported on a porous carrier and having high activity for hydrodesulfurization of sulfur-containing hydrocarbons, said catalyst containing active hydrogenating components which consist essentially of molybdenum and at least two members of the iron group metals, the atomic ratio of one of the members of the iron group to the molybdenum being between about 0.1 and 0.2 and the other member of the iron group being present in an atomic ratio between about 0.01 and 0.05, said active hydrogenating components being present in the form of a member of the group consisting of oxides of said metals, sulfides of said metals, combinations of the oxides of the iron group metals with molybdenum oxide and combinations of the sulfides of the iron group metals with molybdenum sulfide.

5. A catalyst supported on a porous carrier, said catalyst having high activity for hydrodesulfurization of sulfur-containing hydrocarbons and containing active hydrogenating components which consist essentially of molybdenum, cobalt and nickel, the molybdenum being present in amounts of between about 4 and 16 percent, the atomic ratio of cobalt to molybdenum being less than about 0.4 and the atomic ratio of nickel to molybdenum being less than about 0.1 and less than the cobalt, said active hydrogenating components being present in the form of a member of the group consisting of oxides of said metals, sulfides of said metals, combinations of the oxides of the iron group metals with molybdenum oxide and combinations of the sulfides of the iron group metals with molybdenum sulfide.

6. A catalyst supported on a porous carrier, said catalyst having high activity for hydrodesulfurization of sulfur-containing hydrocarbons and containing active hydrogenating components which consist essentially of molybdenum, cobalt and nickel, the molybdenum being present in amounts between about 4 and 16 percent, the atomic ratio of cobalt to molybdenum being between about 0.1 and 0.2 and the atomic ratio of nickel to molybdenum being between about 0.01 and 0.05, said active hydrogenating components being present in the form of a member of the group consisting of oxides of said metals, sulfides of said metals, combinations of the oxides of the iron group metals with molybdenum oxide and combinations of the sulfides of the iron group metals with molybdenum sulfide.

7. The process of desulfurizing a sulfur-containing hydrocarbon which comprises contacting the hydrocarbon with hydrogen under hydrodesulfurization conditions and while in the presence of a catalyst supported on a porous carrier, said catalyst containing active hydrogenating components which consist essentially of molybdenum and at least two members of the iron group metals, the iron group components being present in such amounts that the sum of the atomic ratios of the iron group metals to molybdenum is less than about 0.8 and the atomic ratio of each iron group metal to molybdenum is less than about 0.4, said active hydrogenating components being present in the form of a member of the group consisting of oxides of said metals, sulfides of said metals, combinations of the oxides of the iron group metals with molybdenum oxide and combinations of the sulfides of the iron group metals with molybdenum sulfide.

8. The process of desulfurizing a sulfur-containing hydrocarbon which comprises contacting the hydrocarbon with hydrogen under hydrodesulfurizing conditions and while in the presence of a catalyst supported on alumina, said catalyst containing active hydrogenating components which consist essentially of molybdenum, cobalt and nickel, the molybdenum being present in an amount between about 4 and 16 percent, the atomic ratio of cobalt to molybdenum being between about 0.1 and 0.2 and the atomic ratio of nickel to molybdenum being between about 0.01 and 0.05, said active hydrogenating components being present in the form of a member of the group consisting of oxides of said metals, sulfides of said metals, combinations of the oxides of the iron group metals with molybdenum oxide and combinations of the sulfides of the iron group metals with molybdenum sulfide.

9. The process of desulfurizing a sulfur-containing hydrocarbon which comprises contacting the hydrocarbon with hydrogen under hydrodesulfurization conditions and while in the presence of a catalyst supported on a porous carrier, said catalyst containing active hydrogenating components which consist essentially of molybdenum and at least two members of the iron group metals, the iron group components being present in such amounts that the sum of the atomic ratios of the iron group metals to molybdenum is less than about 0.8 and the atomic ratio of each iron group metal to molybdenum is less than about 0.4 and said molybdenum being present in an amount between about 2 and 25 percent, said active hydrogenating components being present in the form of a member of the group consisting of oxides of said metals, sulfides of said metals, combinations of the oxides of the iron group metals with molybdenum oxide and combinations of the sulfides of the iron group metals with molybdenum sulfide.

10. The process for the hydrogen treatment of a hydrocarbon which comprises contacting the hydrocarbon with hydrogen under conditions resulting in hydrogenation of unsaturated bonds while in the presence of a catalyst supported on a porous carrier, said catalyst containing active hydrogenating components which consist essentially of molybdenum and at least two members of the iron group metals, the iron group components being present in such amounts that the sum of the atomic ratios of the iron group metals to molybdenum is less than about 0.8 and the atomic ratio of each iron group metal to molybdenum is less than about 0.4 and said molybdenum being present in an amount between about 4 and 16 percent, said active hydrogenating components being present in the form of a member of the group consisting of oxides of said metals, sulfides of said metals, combinations of the oxides of the iron group metals with molybdenum oxide and combinations of the sulfides of the iron group metals with molybdenum sulfide.

11. The process of desulfurizing a sulfur-containing hydrocarbon which comprises contacting the hydrocarbon with hydrogen under hydrodesulfurization conditions and while in the presence of a catalyst supported on a porous carrier, said catalyst containing active hydrogenating components which consist essentially of molybdenum and at least two members of the iron group metals, the iron group components being present in such amounts that the sum of the atomic ratios of the iron group metals to molybdenum is less than about 0.8 and the atomic ratio of each iron group metal to molybdenum is less than about 0.4 and said molybdenum being present in an amount of about 8 percent, said active hydrogenating components being present in the form of a member of the group consisting of oxides of said metals, sulfides of said metals, combinations of the oxides of the iron group metals with molybdenum oxide and combinations of the sulfides of the iron group metals with molybdenum sulfide.

References Cited in the file of this patent

UNITED STATES PATENTS

| | | |
|---|---|---|
| 2,650,906 | Engel et al. | Sept. 1, 1953 |
| 2,728,710 | Hendricks | Dec. 27, 1955 |
| 2,739,132 | Riedl | Mar. 20, 1956 |